(12) United States Patent
Simms et al.

(10) Patent No.: US 10,816,215 B2
(45) Date of Patent: Oct. 27, 2020

(54) DIFFUSION CAP BURNER FOR GAS COOKING APPLIANCE

(71) Applicant: Whirlpool Corporation, Benton Harbor, MI (US)

(72) Inventors: Russell L. Simms, Cleveland, TN (US); Siu Hun P. Yam, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 176 days.

(21) Appl. No.: 15/937,136

(22) Filed: Mar. 27, 2018

(65) Prior Publication Data

US 2018/0209657 A1  Jul. 26, 2018

Related U.S. Application Data

(63) Continuation of application No. 14/324,500, filed on Jul. 7, 2014, now Pat. No. 9,951,958, which is a continuation of application No. 12/951,292, filed on Nov. 22, 2010, now Pat. No. 8,800,543.

(30) Foreign Application Priority Data

Nov. 23, 2009  (CN) ............... 2009 2 0345450 U

(51) Int. Cl.
 *F24C 3/08* (2006.01)
 *F23D 14/06* (2006.01)
 *F24C 15/10* (2006.01)

(52) U.S. Cl.
 CPC ............. *F24C 3/08* (2013.01); *F23D 14/06* (2013.01); *F24C 3/085* (2013.01); *F24C 15/107* (2013.01); *Y02B 40/166* (2013.01)

(58) Field of Classification Search
 CPC .......... F23D 14/06; F23D 2900/14062; F24C 3/085; F24C 3/08
 See application file for complete search history.

(56) References Cited

U.S. PATENT DOCUMENTS

| | | | | |
|---|---|---|---|---|
| 1,403,215 A | * | 1/1922 | Wheelock | F23D 14/06 239/405 |
| 3,324,925 A | * | 6/1967 | McLaren | F23D 14/04 239/434 |
| D236,418 S | * | 8/1975 | Duperow et al. | D7/407 |
| 4,518,346 A | * | 5/1985 | Pistien | F23D 14/725 431/266 |
| 4,891,006 A | * | 1/1990 | Le Monnier de Gouville | F23D 14/06 126/39 H |
| 4,953,534 A | * | 9/1990 | De Gouville | F23D 14/06 126/39 H |
| 6,332,460 B1 | * | 12/2001 | Paesani | F23D 14/06 126/39 R |
| 6,537,065 B1 | | 3/2003 | Shirali et al. | |

(Continued)

FOREIGN PATENT DOCUMENTS

JP         H11337016 A      12/1999

*Primary Examiner* — Jorge A Pereiro
(74) *Attorney, Agent, or Firm* — Price Heneveld LLP

(57) ABSTRACT

A gas burner for a cooking appliance includes a frustoconically-shaped crown having a plurality of gas ports defined therein, a cover positioned above the crown, and a shell secured to the cover and positioned on the crown. The shell defines a hollow chamber positioned between the crown and the cover.

6 Claims, 6 Drawing Sheets

(56) References Cited

U.S. PATENT DOCUMENTS

| | | | |
|---|---|---|---|
| 7,291,009 B2 | 11/2007 | Kamal et al. | |
| 7,987,843 B1* | 8/2011 | Rodgers | F23D 14/74 126/39 E |
| 9,194,578 B2* | 11/2015 | Bettinzoli | F23D 14/58 |
| 9,416,963 B2* | 8/2016 | Armanni | F23D 14/06 |
| 2004/0234915 A1* | 11/2004 | Koch | F23D 14/065 431/278 |
| 2006/0051718 A1* | 3/2006 | Kamal | F23D 14/06 431/354 |
| 2006/0121402 A1* | 6/2006 | Bettinzoli | F23D 14/06 431/354 |
| 2007/0059654 A1* | 3/2007 | Armanni | F23D 14/06 431/8 |
| 2009/0205630 A1* | 8/2009 | Pottenger | F23D 14/06 126/39 E |
| 2010/0089384 A1* | 4/2010 | Inzaghi | F23D 14/06 126/39 E |
| 2012/0090595 A1* | 4/2012 | Shaffer | F23D 14/06 126/39 E |

* cited by examiner

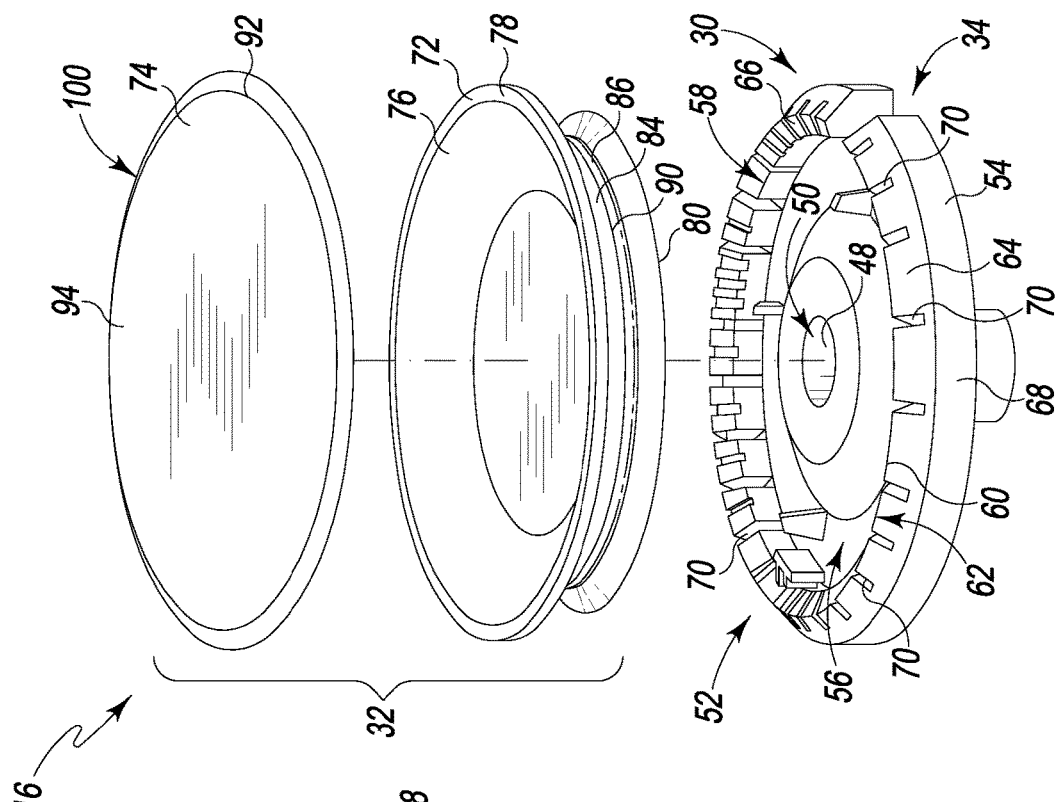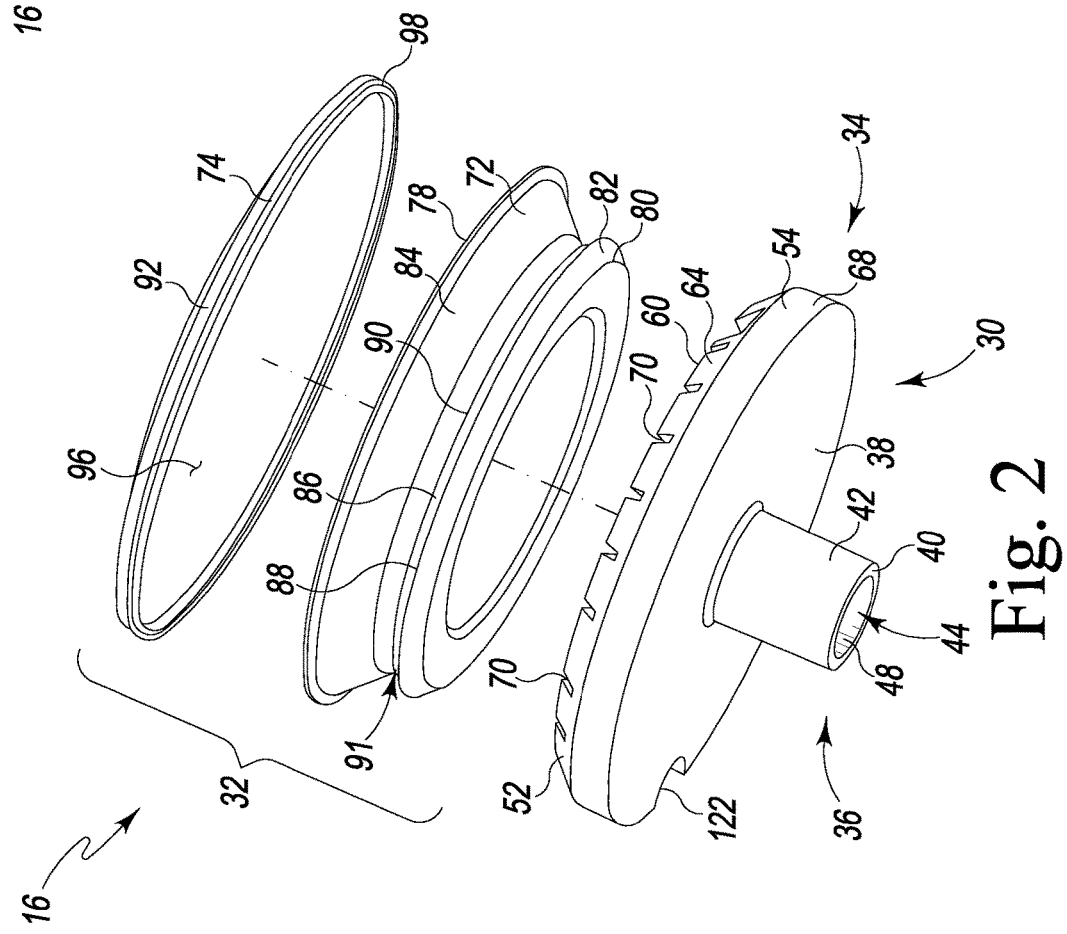

DIFFUSION CAP BURNER FOR GAS COOKING APPLIANCE

CROSS-REFERENCE TO RELATED APPLICATIONS

The present application represents a continuation application of and claims priority to U.S. patent application Ser. No. 14/324,500, now U.S. Pat. No. 9,951,958, entitled "Diffusion Cap Burner for Gas Cooking Appliance" filed Jul. 7, 2014, which is a continuation application of U.S. patent application Ser. No. 12/951,292 entitled "Diffusion Cap Burner For Gas Cooking Appliance" filed Nov. 22, 2010, now U.S. Pat. No. 8,800,543, which claims priority to Chinese Patent Application No. 200920315450.4, filed on Nov. 23, 2009, and are all incorporated herein by reference in their entirety.

BACKGROUND OF THE DISCLOSURE

The present disclosure relates generally to a gas cooking appliance having gas burners and more particularly to gas cooking appliances with gas diffusion caps.

A gas cooking appliance is used to cook meals and other foodstuffs on a cooking surface or within an oven. Gas cooking appliances include ranges, cooktops, stoves, and other cooking appliances. Gas cooking appliances use natural gas or liquid petroleum (i.e., propane) fuel to create a controlled flame that generates the heat necessary for cooking.

SUMMARY OF THE INVENTION

According to one aspect, a cooking appliance is disclosed. The cooking appliance includes a cooktop having a cooking surface and a gas burner positioned below the cooking surface. The gas burner includes a frustoconically-shaped crown having a plurality of gas ports defined therein, a cover positioned above the crown, and a shell secured to the cover and positioned on the crown. The shell defines a hollow chamber positioned between the crown and the cover.

In some embodiments, the diameter of an upper rim of the crown may be less than the diameter of the cover. In some embodiments, the ratio of the diameter of the cover relative to the diameter of the upper rim of the crown may be between about 1.2:1 and 1.6:1.

Additionally, in some embodiments, the shell may include a lower flange coupled to the upper rim of the crown, an upper rim having the cover secured thereto, and a waist positioned between the upper rim and the lower flange. The diameter of the waist may be less than the diameter of the upper rim of the crown.

In some embodiments, the frustoconically-shaped crown may include an inclined annular surface and may be attached to a circular base having a vertical annular surface. A first imaginary line may extend along the inclined annular surface and a second imaginary line may extend along the vertical annular surface. An angle may be defined between the first imaginary line and the second imaginary line. In some embodiments, the magnitude of the angle may be between 30 degrees and 45 degrees.

In some embodiments, the shell may include a first inclined surface. A third imaginary line may extend along the first inclined surface, and the third imaginary line may be coincident with the first imaginary line. In some embodiments, the shell may further include a second inclined surface, and a fourth imaginary line may extend along the second inclined surface orthogonal to the third imaginary line.

In some embodiments, the cover may be positioned between 21 mm and 25 mm above the crown.

According to another aspect, a gas burner for a cooktop includes a frustoconically-shaped crown having a plurality of gas ports defined therein, a cover positioned above the crown, and a shell secured to the cover and positioned on the crown. The shell defines a hollow chamber positioned between the crown and the cover.

In some embodiments, the frustoconically-shaped crown may include an inclined annular surface and may be attached to a circular base having a vertical annular surface. A first imaginary line may extend along the inclined annular surface and a second imaginary line may extend along the vertical annular surface. An angle may be defined between the first imaginary line and the second imaginary line.

In some embodiments, the shell may include a waist where the first inclined surface intersects with the second inclined surface. The crown may include an upper rim, and the diameter of the waist may be less than the diameter of the upper rim of the crown. In some embodiments, the diameter of the upper rim of the crown is less than the diameter of the cover.

According to another aspect, the gas burner includes a cap having a hollow chamber defined therein, and a body having a plurality of gas ports defined therein. The body has an inclined annular surface and a vertical annular surface. A first imaginary line extends along the inclined annular surface and a second imaginary line extends along the vertical annular surface, an angle is defined between the inclined annular surface and the vertical annular surface, and the magnitude of the angle is between 30 degrees and 45 degrees.

In some embodiments, the ratio of the diameter of an upper surface of the cap relative to the diameter of an upper rim of the body may be greater than or equal to about 1.2:1. In some embodiments, the ratio of the diameter of the upper surface of the cap relative to the diameter of the upper rim of the body may be less than or equal to about 1.6:1.

These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which:

FIG. 2 is an exploded perspective view of one embodiment of a diffusion cap burner of the gas cooking appliance of FIG. 1;

FIG. 3 is another exploded perspective view of the diffusion cap burner of FIG. 2;

Figure 1:
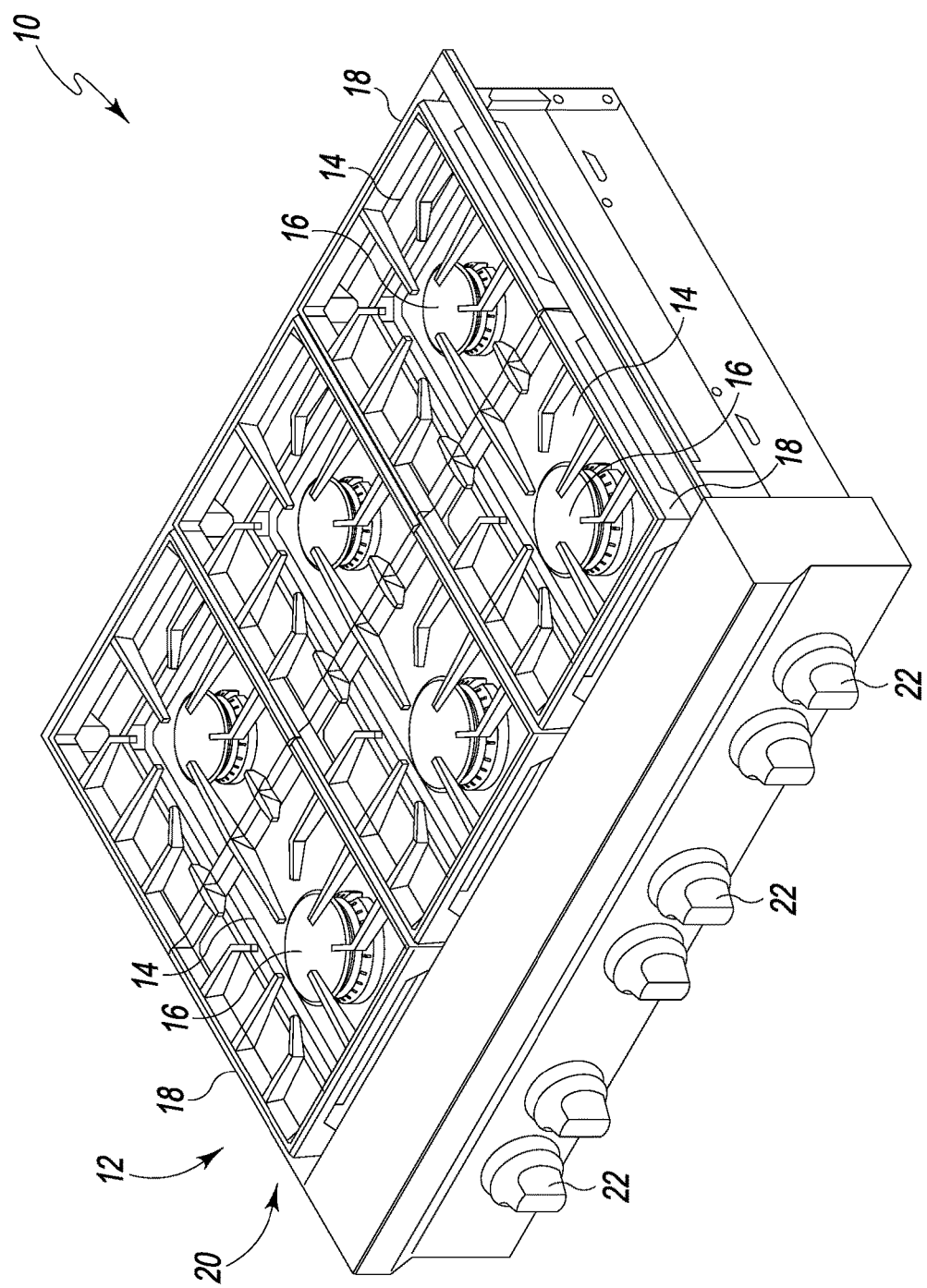
FIG. 1 is a perspective view of a gas cooking appliance.

The components in the figures are not necessarily to scale, emphasis instead being placed upon illustrating the principles described herein.

DETAILED DESCRIPTION

The present illustrated embodiments reside primarily in combinations of method steps and apparatus components related to a diffusion cap burner for a gas cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a gas cooking appliance 10 (hereinafter appliance 10) is shown. The appliance 10 includes a cooktop 12 having a plurality of separately controlled cooking areas 14. Each separately controlled cooking area 14 has a burner 16 dedicated to supplying heat to that area of the cooktop 12. Each of the burners 16 has a grate 18 positioned above it, and the grates 18 define a cooking surface 20. Each of the burners 16 is configured to produce a controlled flame that generates a quantity of heat, which may be used to heat cooking utensils (i.e., pots and pans) placed on the grates 18. The burners 16 and the grates 18 are arranged on the cooktop 12 such that a user can simultaneously heat pots, pans, skillets, and the like. As shown in FIG. 1, the cooktop 12 is configured to be positioned in a kitchen counter or cabinet. It will be appreciated that in other embodiments the cooktop 12 may be integrated with a freestanding range or other appliance.

The magnitude of the heat generated by each of the burners 16 is proportionate to the amount of gas supplied to the burner 16. A user may adjust the supply of gas to the burners 16 using a set of knobs 22 that are positioned at the front of the cooktop 12. As the user rotates one of the knobs 22, the amount of gas flowing to the corresponding burner 16 is adjusted to change the magnitude of the heat generated by the burner 16.

Referring now to FIGS. 2-5, one embodiment of a gas burner 16 is shown in greater detail. The gas burner 16 includes a flame spreader 30 and a cap 32 configured to be coupled to the flame spreader 30. The flame spreader 30 includes a circular housing 34 and a gas inlet port 36 extending downwardly from a bottom surface 38 of the housing 34 to a distal end 40. The inlet port 36 has a cylindrical body 42 with a lower opening 44 defined in the distal end 40. The lower opening 44 is configured to be connected to a gas source (not shown). The body 42 of the inlet port 36 includes a passageway 48 extending from the lower opening 44 to an upper opening 50 defined in the housing 34.

The housing 34 includes a frustoconically-shaped crown 52 extending upwardly from a circular bottom wall 54 to define a chamber 56. The chamber 56 has a circular opening 58 defined by an upper rim 60 of the crown 52, and the upper rim 60 has a diameter 62. The crown 52 has inclined annular surface 64 and inner surface 66 extending downwardly from the rim 60. A vertical annular surface 68 of the bottom wall 54 extends upwardly from the bottom surface 38 of the housing 34 and is connected to the inclined annular surface 64. It will be appreciated that in other embodiments the annular surface 68 may extend at angle rather than vertically as shown in the illustrative embodiment.

A plurality of slots or gas outlet ports 70 are defined in the crown 52. Each gas outlet port 70 extends downwardly from the rim 60 and radially inward from the inclined annular surface 64 to the inner surface 66. It will be appreciated that the gas outlet ports 70 may be sized differently in other embodiments. Additionally, in other embodiments, additional or fewer gas outlet ports 70 may be formed in the crown 52. As shown in FIG. 3, the upper opening 50 of the gas inlet port 36 is also positioned in the chamber 56. In that way, the gas inlet port 36 is in fluid communication with the gas outlet ports 70.

The cap 32 of the burner 16 includes a shell 72 and a circular cover 74 configured to be secured to the shell 72. The shell 72 and the cover 74 may be formed from any heat resistant material, including metallic materials such as, for example, stamped steel or brass and non-metallic materials such as, for example, porcelain. It will also be appreciated that the shell 72 and the cover 74 may be formed from the same material or from different materials.

The shell 72 has a bowl-shaped chamber 76 defined therein extending downwardly from an upper rim 78. The shell 72 includes a bottom annular flange 80 configured to engage with the crown 52. The flange 80 has a lower inclined surface 82 that matches the inner surface 66 of the crown 52. When the cap 32 is seated on the housing 34, the surface 82 of the shell 72 is positioned on the surface 66 of the crown 52, thereby enclosing the opening 58 of the chamber 56 of the crown 52.

Figure 5:
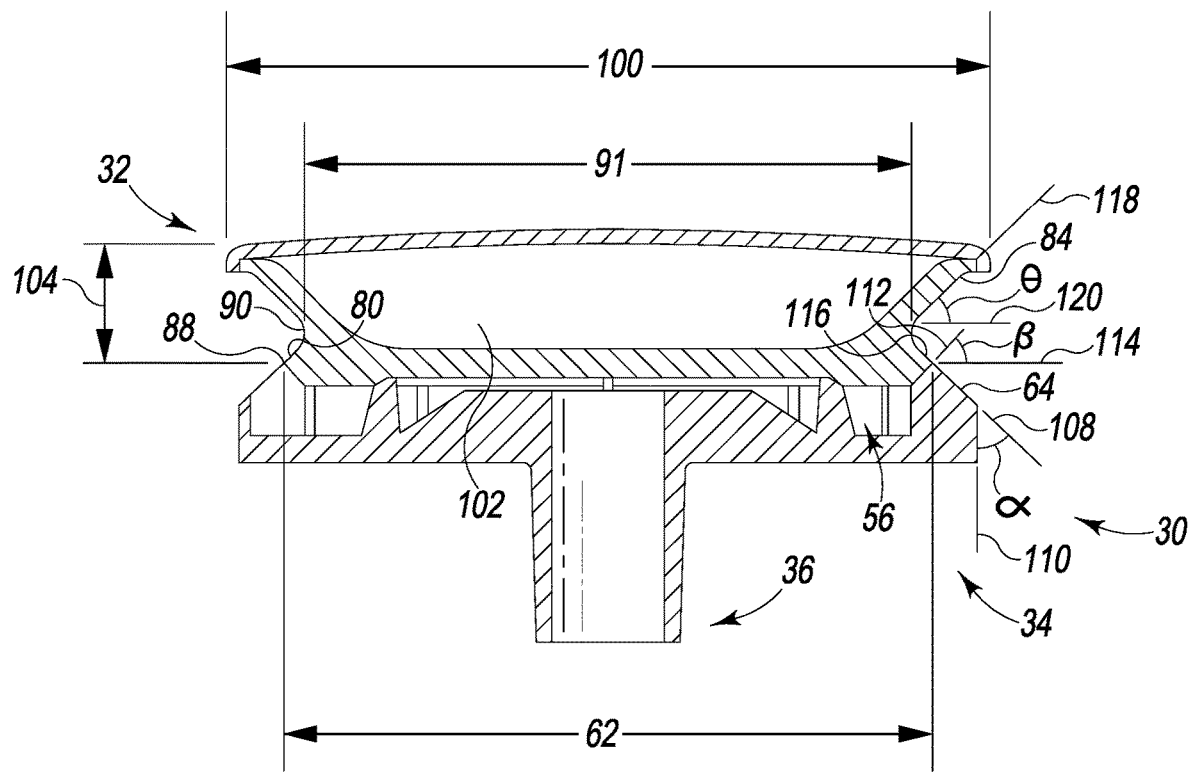
FIG. 5 is a side elevational view of the diffusion cap burner of FIGS. 2-4.

The shell 72 includes an inclined annular surface 84 extending downwardly from the rim 78. Another inclined annular surface 86 extends upwardly from a peripheral edge 88 of the flange 80 and intersects with the surface 84 at a waist or middle section 90 of the shell 72. As shown in FIG. 5, the middle section 90 has a diameter 91 less than the diameter 62 of the upper rim 60 of the housing 34.

The cover 74 has a body 92 including an upper surface 94 of the cap 32. The body 92 is bowed or arched such that the upper surface 94 is convex. A hollow chamber 96 is defined by the body 92 and extends upwardly from a lower rim 98 of the cover 74. It will be appreciated in other embodiments the body 92 of the cover 74 may be flat or planar such that the chamber 96 is omitted from the cover 74. The body 92 has a diameter 100 greater than the diameter 62 of the upper rim 60 of the housing 34. The ratio of the diameter 100 to the diameter 62 is in the range of 1.4:1 to 1.6:1. In other embodiments, the ratio of the diameters 62, 100 may vary according to the burner type or cooking appliance.

When the cover 74 is secured to the shell 72, the lower rim 98 of the cover 74 extends over the upper rim 78 of the shell 72, thereby enclosing the chambers 76, 96 and forming a single hollow cavity 102 within the cap 32. The cover 74 may be secured to the shell 72 via welding, crimping, or brazing. In some embodiments, one or more fasteners, such as, for example, screws, rivets, pins, or pegs may be used to secure the cover 74 to the shell 72.

The assembled gas burner 16 is shown in FIG. 5. When the cap 32 is seated on the housing 34, the cover 74 is positioned a distance 104 from the upper rim 60 of the crown 52. The distance 104 is between 21 mm and 25 mm. In other embodiments, the distance 104 may vary according to the burner type or cooking appliance.

The burner 16 includes a number of surfaces that are angled relative to each other. This is demonstrated geometrically in the side elevational view of FIG. 5 where a number of imaginary lines extend along and through the outer surfaces of the burner 16. Specifically, an imaginary line 108 extends along the inclined annular surface 64 of the crown 52. Another imaginary line 110 extends along the vertical annular surface 68 of the bottom wall 54. An angle $\alpha$ is defined between the imaginary line 108 and the imaginary line 110. The magnitude of the angle $\alpha$ is between 30 degrees and 45 degrees. In other embodiments, the angle $\alpha$ may vary according to the burner type or cooking appliance.

As shown in FIG. 5, another imaginary line 112 extends orthogonal to the inclined annular surface 64 of the crown 52. An angle $\beta$ is defined between the imaginary line 112 and a horizontal axis 114 extending through the housing 34. In the illustrative embodiment, the magnitude of the angle $\beta$ is equal to the magnitude of the angle $\alpha$. Another imaginary line 116 extends along the inclined annular surface 86 of the shell 72. When the cap 32 is seated on the housing 34 as shown in FIG. 5, the imaginary line 116 is coincident with the imaginary line 108 extending along the inclined annular surface 64 of the crown 52.

In the illustrative embodiment, an imaginary line 118 extends along the inclined annular surface 84 of the shell 72 orthogonal to the imaginary lines 108, 116. It will be appreciated that in other embodiments the slope of the inclined annular surface 84 may vary such that the imaginary line 118 is not orthogonal to the imaginary lines 108, 116. Additionally, an angle $\theta$ is defined between the imaginary line 118 and a horizontal axis 120 extending through the shell 72. In the illustrative embodiment, the magnitude of the angle $\theta$ is equal to the magnitude of the angle $\alpha$. It will also be appreciated that in other embodiments the magnitude of the angle $\theta$ may be different from the magnitude of the angle $\alpha$ and may be between 30 degrees and 45 degrees. Additionally, the angle $\theta$ may vary according to the burner type or cooking appliance.

During burner operation, gas is supplied to the lower opening 44 of the inlet port 36. Gas then advances up the passageway 48 and outward through the upper opening 50 into the chamber 56. Gas is advanced out of the chamber 56 through each of the outlet ports 70 defined in the crown 52 and is ignited by an ignition device (not shown) positioned in a niche 122 formed in the housing 34 to form a flame. When operated at a low simmer, the flame is positioned below the cap 32, thereby diffusing heat away from the cooking utensil positioned on the cooking area 14. Because the shell 72 is positioned between the cover 74 and the flame spreader 30, the cavity 102 acts as an insulator to reduce heat transfer from the flame generated at the flame spreader 30 to the cover 74.

Figure 6:
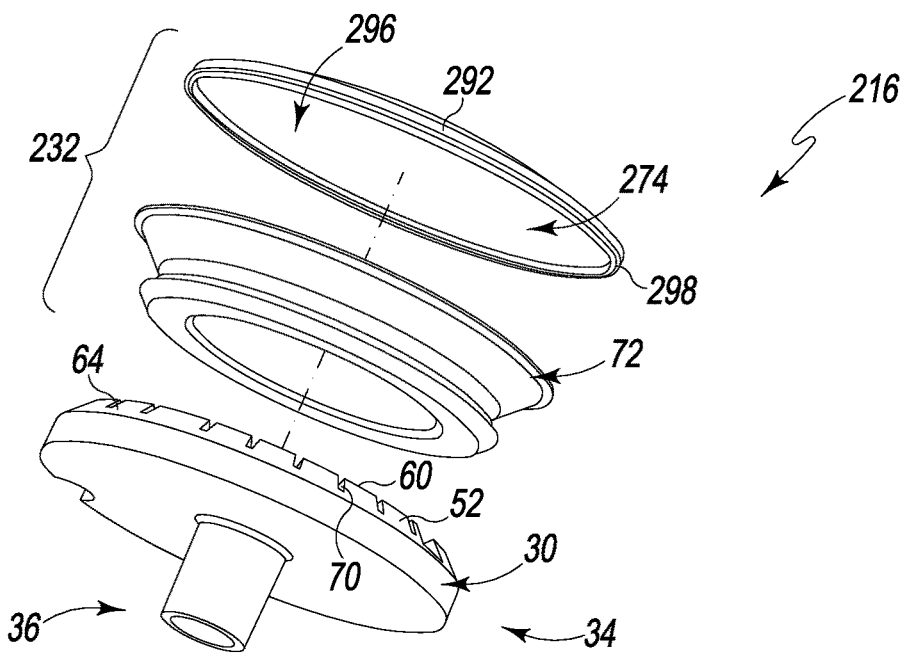
FIG. 6 is an exploded perspective view of another embodiment of a diffusion cap burner of the gas cooking appliance of FIG. 1.
Figure 7:
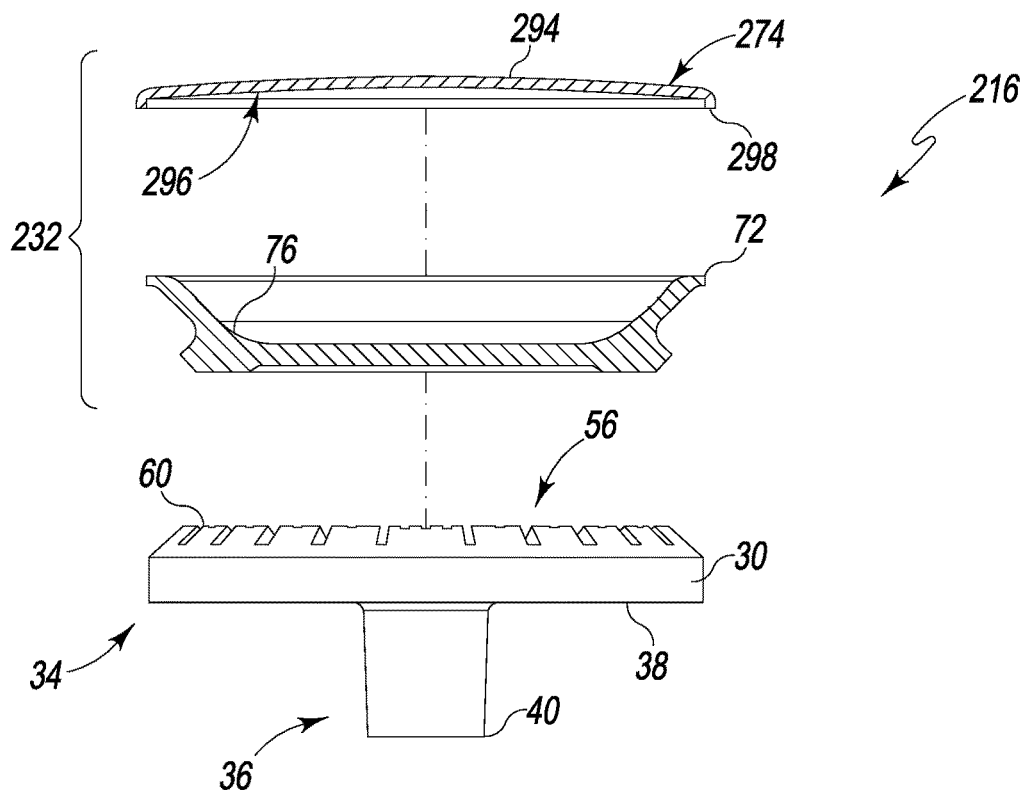
FIG. 7 is an exploded partial cross-sectional side elevation view of the diffusion cap burner of FIG. 6.

Referring now to FIGS. 6 and 7, another embodiment of the gas burner (hereinafter gas burner 216) is shown. Some features of the embodiment illustrated in FIGS. 6 and 7 are substantially similar to those discussed above in reference to the embodiment of FIGS. 2-5. Such features are designated in FIGS. 6 and 7 with the same reference numbers as those used in FIGS. 2-5.

The gas burner 216 includes a flame spreader 30 and a cap 232 configured to be coupled to the flame spreader 30. The flame spreader 30 includes a housing 34 and a gas inlet port 36 extending downwardly from a bottom surface 38 of the housing 34 to a distal end 40. The housing 34 includes a frustoconically-shaped crown 52 extending upwardly from a circular bottom wall 54 to define a chamber 56. A plurality of gas outlet ports 70 are defined in the crown 52. Each gas outlet port 70 extends downwardly from the rim 60 of the crown 52 and radially inward from the inclined annular surface 64 to the inner surface (not shown).

Figure 4:
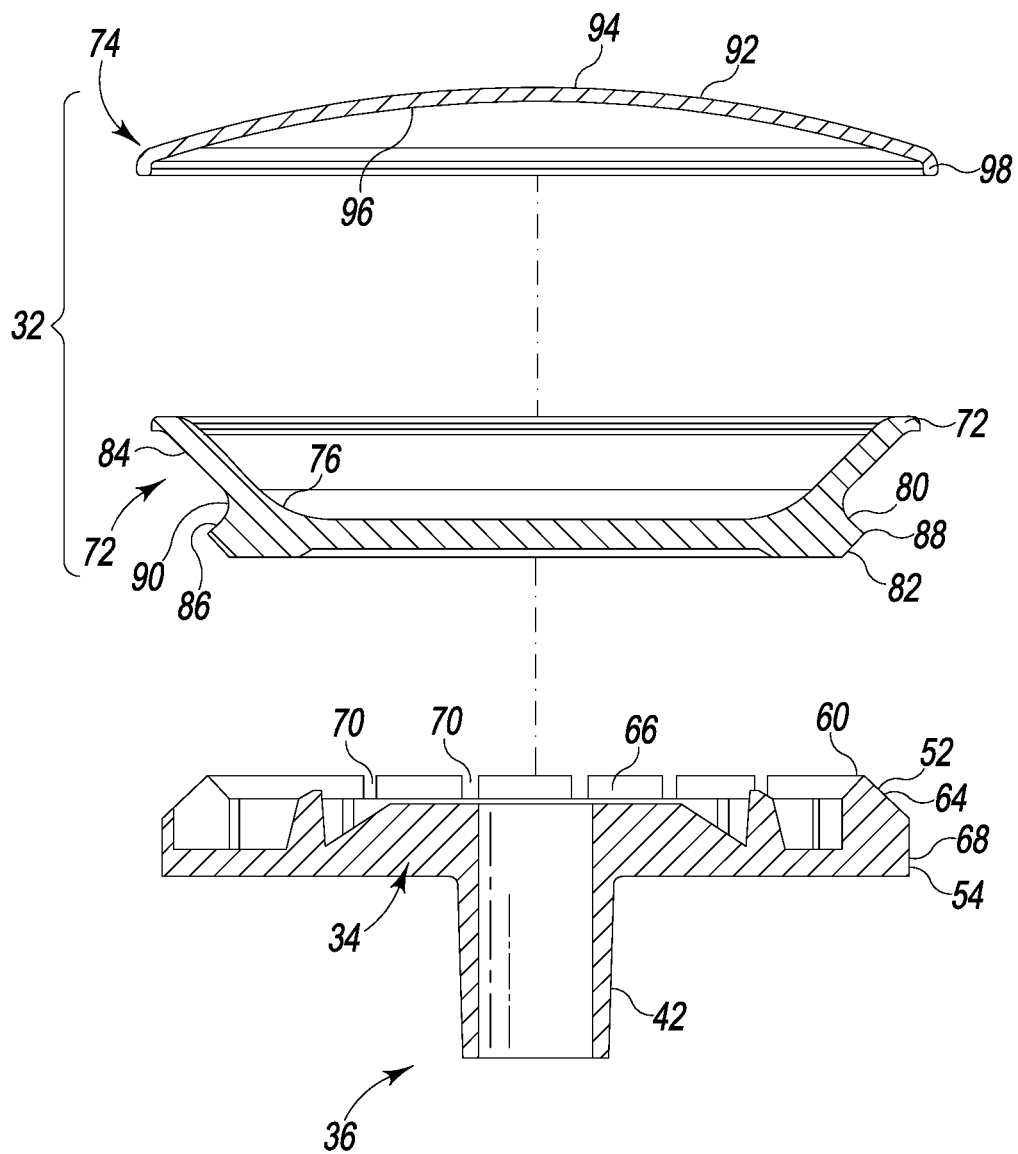
FIG. 4 is an exploded cross-sectional side elevation view of the diffusion cap burner of FIGS. 2 and 3.

The cap 232 of the burner 16 includes a shell 72 and a circular cover 274 configured to be secured to the shell 72. The cover 274 has a body 292 including an upper surface 294 of the cap 32. The body 292 is bowed or arched such that the upper surface 294 is convex. A hollow chamber 296 is defined by the body 292 and extends upwardly from a lower rim 298 of the cover 74. As shown in FIG. 4, the body 292 is bowed less than the body 92 of the embodiment of FIGS. 2-5. In that way, the chamber 296 defined by the body 292 is smaller than the chamber 96 defined by the body 92. When the cover 274 is secured to the shell 72, the lower rim 298 of the cover 74 extends over the upper rim 278 of the shell 72, thereby enclosing the chambers 76, 296 and forming a single hollow cavity within the cap 232.

Figure 8:
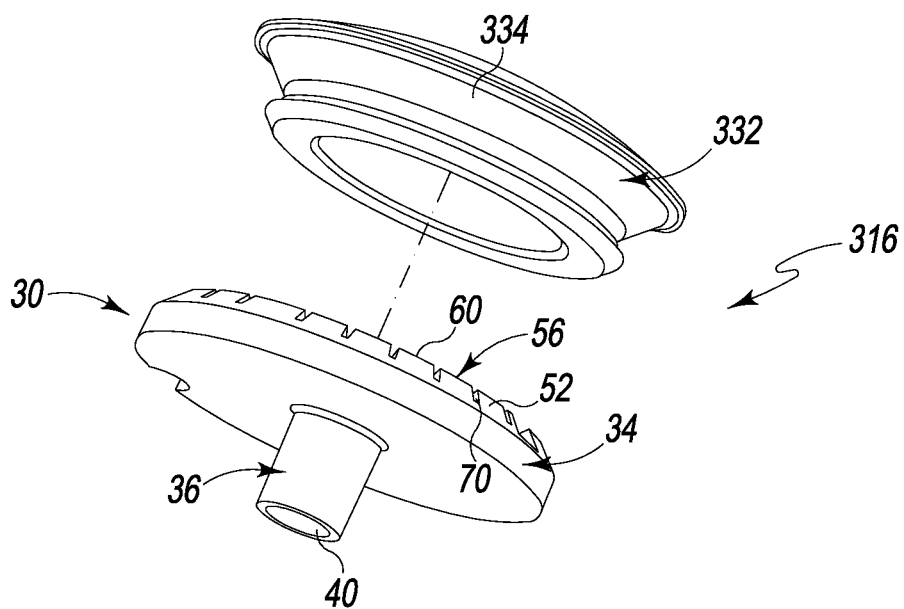
FIG. 8 is an exploded perspective view of another embodiment of a diffusion cap burner of the gas cooking appliance of FIG. 1.
Figure 9:
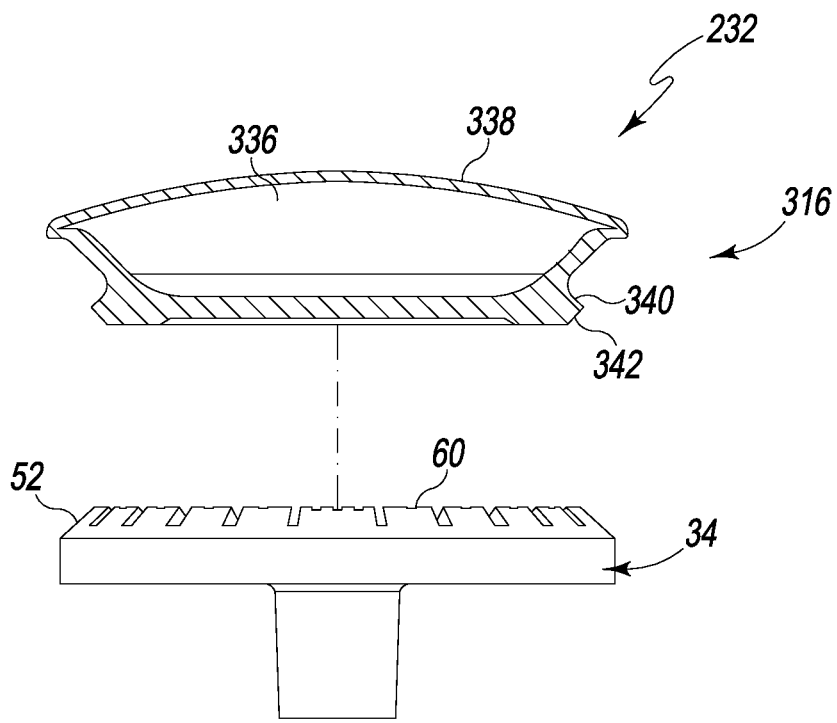
FIG. 9 is an exploded partial cross-sectional side elevation view of the diffusion cap burner of FIG. 8.

Referring now to FIGS. 8 and 9, another embodiment of the gas burner (hereinafter gas burner 316) is shown. Some features of the embodiment illustrated in FIGS. 8 and 9 are substantially similar to those discussed above in reference to the embodiment of FIGS. 2-5. Such features are designated in FIGS. 8 and 9 with the same reference numbers as those used in FIGS. 2-5.

The gas burner 316 includes a flame spreader 30 and a cap 332 configured to be coupled to the flame spreader 30. The flame spreader 30 includes a housing 34 and a gas inlet port 36 extending downwardly from a bottom surface 38 of the housing 34 to a distal end 40. The housing 34 includes a frustoconically-shaped crown 52 extending upwardly from a circular bottom wall 54 to define a chamber 56. A plurality of gas outlet ports 70 are defined in the crown 52. Each gas outlet port 70 extends downwardly from the rim 60 of the crown 52 and radially inward from the inclined annular surface 64 to the inner surface 66.

The cap 332 of the burner 16 includes a body 334 having a hollow chamber 336 defined therein. In that way, the cap 332 is formed as a single integral component. The body 334 may be formed from any heat resistant material, including metallic materials such as, for example, stamped steel or brass and non-metallic materials such as, for example, porcelain. The body 334 may be formed via casting, molding, or other suitable process.

The body 334 includes an upper surface 338 and a bottom annular flange 340 configured to engage with the crown 52. The flange 340 has a lower inclined surface 342 that matches the inner surface (not shown) of the crown 52. When the cap 32 is seated on the housing 34, the surface 342 of the body 334 is seated on the crown 52, thereby enclosing the opening 58 of the chamber 56 of the crown 52.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A gas burner, comprising:
a spreader including a housing having a bottom surface and a vertical annular surface extending upwardly from the bottom surface, the spreader further including a frustoconically shaped crown having a first inclined annular surface extending upwardly from the vertical annular surface of the housing to a crown upper, an inner surface extending downwardly from the upper rim, and a plurality of gas ports defined through the crown and extending downwardly and outwardly from the inner surface, a diameter of the crown upper rim being less than a diameter of the vertical annular surface;
a shell including a lower flange having a peripheral edge aligned with the upper rim of the crown, a second inclined annular surface extending upwardly from the peripheral edge of the lower flange in a generally contiguous manner with the first inclined annular surface and extending to a waist, a third inclined annular surface extending upwardly and outwardly from the waist to a shell upper rim such that the waist is positioned between the shell upper rim and the lower flange, a fourth inclined annular surface extending downwardly from the peripheral edge in an uninterrupted manner and enclosing the plurality of gas ports at the crown upper rim, a diameter of the waist being less than a diameter of the shell upper rim, and the shell being positioned on the crown with the lower flange of the shell coupled to the crown upper rim; and
a cover positioned above the shell and secured to the shell upper rim.

2. The gas burner of claim 1, wherein, in a cross-section taken anywhere across a longitudinal extent of the shell coupled to the crown:
an angle is defined between the first inclined annular surface and the vertical annular surface; and
the first inclined annular surface and the second inclined annular surface are aligned.

3. The gas burner of claim 2, wherein a magnitude of the angle is between 30 degrees and 45 degrees.

4. The gas burner of claim 1, wherein the diameter of the crown upper rim is less than the diameter of the cover.

5. The gas burner of claim 1, wherein the shell further defines a hollow chamber positioned between the crown and the cover.

6. The gas burner of claim 1, wherein the cover is positioned between 21 mm and 25 mm above the crown.

* * * * *